Patented Sept. 18, 1928.

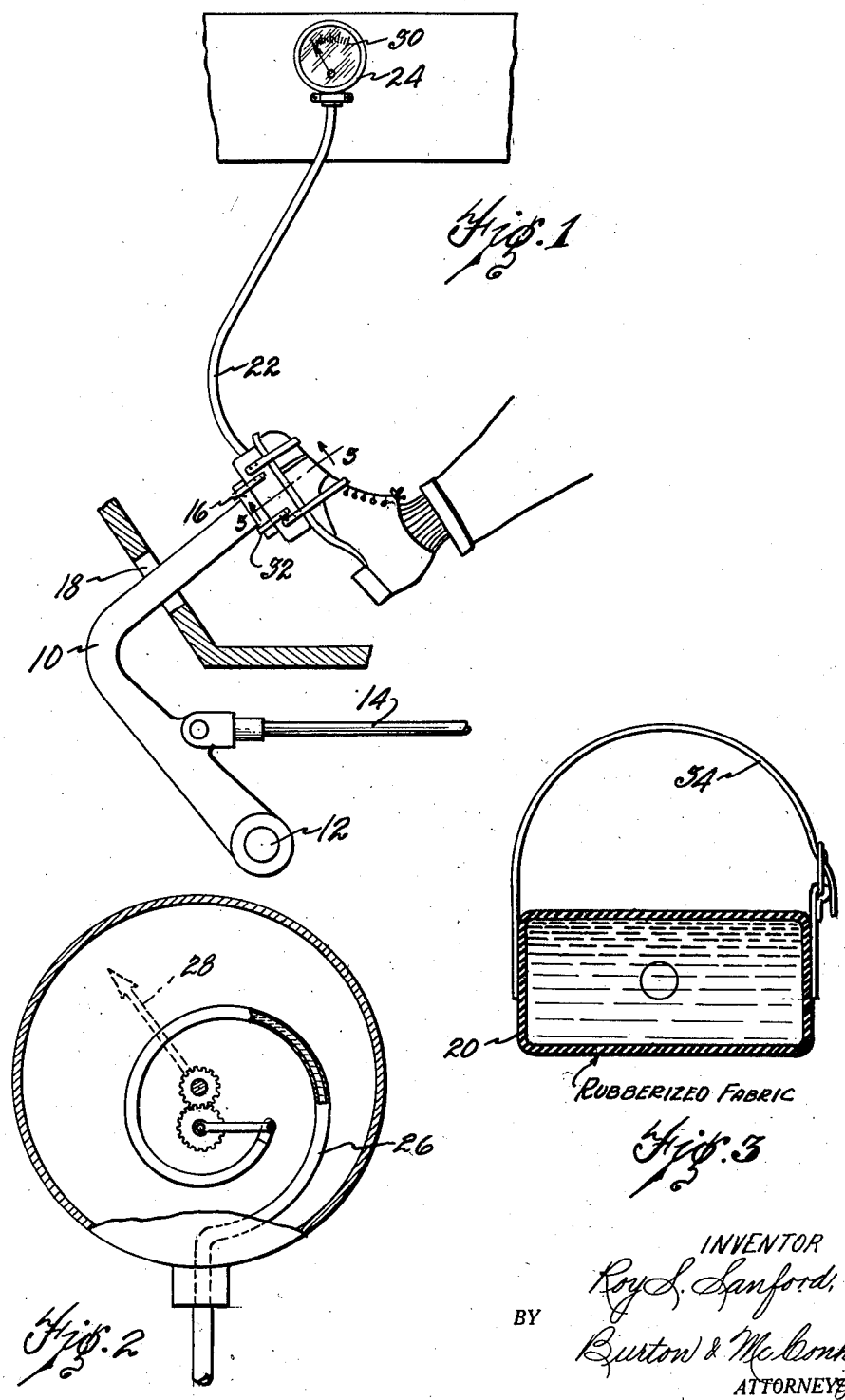

1,684,639

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE PRESSURE GAUGE.

Application filed February 28, 1927. Serial No. 171,504.

My invention relates to an improved process and apparatus for measuring the pressure applied to a vehicle brake pedal by the operator in using the brakes.

An object is the provision of simple, sturdy, inexpensive, easily operable mechanism capable of association with the brake pedal to register the pressure applied thereto by the operator.

In testing brake mechanism it is often desirable to be able to measure the pedal pressure required to achieve certain determined results. It is likewise desirable that the mechanism employed should be simple, durable, readily adaptable for use and capable of functioning under any and all conditions of service. My improved process is intended to meet these requirements and the mechanism employed is designed to accomplish these ends.

Other advantageous objects and meritorious features of my improved process and apparatus will more fully appear from the following specification, appended claim and accompanying drawing.

In the drawing:

Fig. 1 is a fragmentary elevation of my improved apparatus in use.

Fig. 2 is a sectional view through a portion of my improvement.

Fig. 3 is a sectional view through my apparatus taken on line 3—3 of Fig. 1.

My invention is adapted for use in association with the operating pedal of vehicle brake mechanism of any type or class. Let 10 indicate a brake pedal pivoted at 12 and provided with a connection 14 leading to suitable brake mechanism not shown in the drawing. The pedal has a tread portion 16 and projects, as shown, through an aperture 18 in the floor board of the vehicle.

In accomplishing the object of my invention I provide a pressure indicating device comprising a flexible flat pressure pad 20 which is formed of suitable material such as rubber and filled with a suitable liquid such as oil. This pressure pad communicates through a flexible conduit 22 with pressure indicating mechanism indicated in assembly as 24.

I have here shown the well known Bourdon manometer wherein the curved tube 26 actuates the indicator 28 to register on the scale 30 the pressure of compression applied to the fluid within the pressure pad 20.

The pressure pad 20 is here shown as adapted to be readily fitted upon the pedal as indicated in Fig. 1. I have here shown such pad as provided with straps 32 fastened about the tread portion of the pedal. It may also be provided with straps 34 adapted to engage over the shoe of the operator. Obviously such fastening means as is most desirable might be employed.

In use the pressure pad is fitted in place and when the operator applies pressure thereto to actuate the pedal to apply the brake mechanism, the pressure applied is registered upon the scale 30.

What I claim is:

A motor vehicle having a brake pedal and a dash in combination with apparatus for registering the pressure applied to the pedal by the foot of an operator comprising a pressure gauge mounted on the dash, a pressure pad mounted upon the pedal and communicating means extending from the pad to the gauge to register on the gauge the pressure applied to the pad.

In testimony whereof, I, ROY S. SANFORD, sign this specification.

ROY S. SANFORD.